April 5, 1932.　　　T. BUCHHOLD　　　1,852,232

ROTATING MAGNET

Filed July 14, 1930

Inventor
Theodor Buchhold
By
Attorney

Patented Apr. 5, 1932

1,852,232

UNITED STATES PATENT OFFICE

THEODOR BUCHHOLD, OF MANNHEIM-NEUOSTHEIM, GERMANY

ROTATING MAGNET

Application filed July 14, 1930, Serial No. 467,681, and in Germany July 15, 1929.

This invention relates to improvements in electro-magnets and particularly to magnets having a rotatable portion capable of producing a relatively high torque at small angular displacements.

Rotating magnets heretofore did not produce a sufficiently great and positive torque in the small angles of rotation to permit use thereof, as operating devices, for which certainty in operation is a requisite. The torque of such rotating magnets generally decreases proportionately as the angle of rotation decreases and, ofttimes, it was found that the decrease was so rapid as to prevent the use of rotating magnets, particularly when only a small path of movement of the device to be operated was desirable.

It is, therefore, among the objects of the present invention to provide a rotating magnet of suitable construction which will produce a high torque, particularly over and independently of small angular movement.

Another object of the invention is to provide a multi-pole rotating electro-magnet in which the magnetic flux will be greatly increased and distributed substantially equally to the several poles of core members carrying the coils and the poles of an armature surrounding the core and the coils.

Objects and advantages, other than those above set forth, will be apparent from the following description when read in connection with the drawings, in which Figure 1 is a cross-sectional view taken on a plane at right angles to the axis of a structure embodying the present invention;

Figure 1:
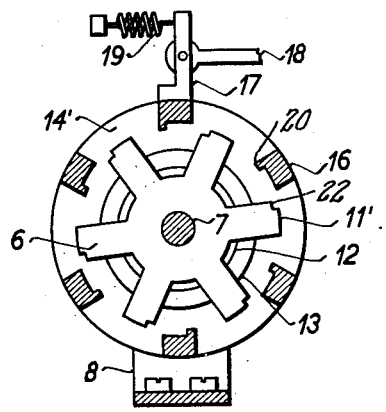

Referring more particularly to the drawings by characters of reference, the reference numerals 6 and 6' designate, generally, cores or core members which are each mounted on and affixed to a shaft 7 fixedly supported by a support or pedestal 8. The core member 6 is shown as formed with a hub portion 9 having a plurality of angled poles 11 and and the core member 6' has a plurality of angled poles 11' extending therefrom in such manner as to extend over and substantially enclose a plurality of coils 12 and 13 arranged concentrically about the hub 9.

The armature of the magnet is formed from two disks 14 and 14', preferably of non-magnetic material, rotatably mounted on the shaft 7 and interconnected by a plurality of pole pieces 16. The armature carries an extension 17 to which may be connected a rod or other connecting means 18 leading to a device to be operated. When the magnet is constructed to rotate the armature in a clockwise direction, a spring 19 is secured to the extension to return the armature to the initial position as shown in the drawings.

Figure 2:
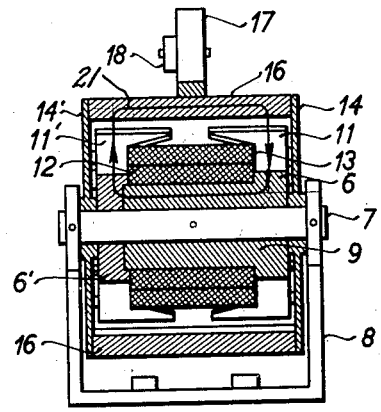
Fig. 2 is a cross-sectional view of the structure shown in Fig. 1 on a plane parallel to the axis thereof and at right angles to the view shown in Fig. 1.
Figure 3:
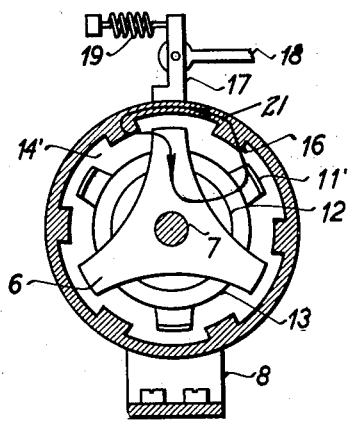
Fig. 3 is a view, similar to that shown in Fig. 1, of a modified form of the invention.
Figure 4:
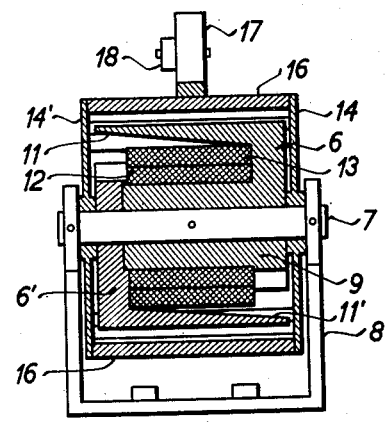
Fig. 4 is a view, similar to that shown in Fig. 2, of the modified embodiment of the invention shown in Fig. 3.

If the armature poles 16 are formed with off-set ends 20, as shown in Fig. 1, and the core poles are made with corresponding complementary ends 22, the tractive forces are greatly increased, the closer the poles move into contact and vice versa. The embodiment of the invention as shown in Fig. 2, differs from the embodiment shown in Fig. 1 in that in the embodiment of Fig. 2 the poles 11 and 11' are spaced from each other in the circumferential direction and are materially wider in the axial direction than those shown in Fig. 1.

It will be seen by referring to the drawings that the density of the lines of force, shown in lines 21, are greatly increased. In the embodiment in Fig. 1, the flux flows from the core 6' through the pole 11', the air gap between the core pole 11' and the armature pole 16, through the pole 16, the air gap, the core pole 11, the core 6, and back to the core 6'. In the structure shown in Fig. 2, the flux flow may be readily seen and the path thereof is accordingly not specifically set forth. The result of such flux flow is that, if the armature is immovable, the coil will move in a counter-clockwise direction and, vice versa, that if the coil is immovable, the armature will move in a clockwise direction, providing always that the pedestal and the shaft are fixed. The movable portion 18 may be connected to any device to be operated, such as a measuring instrument indicator, a resistance regulator, electric contacts, hydraulic or pneumatic valves, optic or acoustic signals or to the opening device of a safety arrangement. The return of the movable portion to its original position is obtained, as is shown, by using the opposing force of the spring.

Although but two embodiments of the present invention have been illustrated and described, it will be apparent to those skilled in the art that various changes and modifications may be made therein without departing from the spirit of the invention or from the scope of the appended claims.

The invention claimed is:

1. In a rotating electro-magnet, a supporting member, a shaft affixed to said member, a core member having a plurality of poles arranged upon said shaft, a magnetizing coil arranged upon said core member, a multipolar armature rotatably arranged adjacent the core member, and means for returning said armature to the initial position after rotation thereof.

2. In a rotating electro-magnet, a supporting member, a shaft affixed to said member, a core member having a plurality of poles arranged upon said shaft, a magnetizing coil arranged upon said core member, a multi-polar armature rotatably arranged about the core member, the poles of said core member corresponding in number to the poles of said armature and being closely adjacent thereto, and means for returning said armature to the initial position after rotation thereof.

3. In a rotating electro-magnet, a shaft, means for supporting said shaft against movement, a plurality of core members affixed to said shaft, each of said members having a plurality of poles, said core members being so arranged on said shaft that the poles thereof extend in alternate directions, a plurality of magnetizing coils arranged upon said core members and substantially inclosed by the poles thereof, a multipolar armature rotatably arranged about the core members, and means for returning said armature to the initial position after rotation thereof.

4. In a rotating electro-magnet, a shaft, means for supporting said shaft against movement, a plurality of core members each having a like number of poles fixedly arranged on said shaft in interleaved relation, a plurality of magnetizing coils arranged concentrically upon said core members and substantially inclosed by the poles thereof, a multi-polar armature rotatably arranged about said core members, and means for returning said armature to the initial position after rotation thereof.

5. In a rotating electro-magnet, a shaft, means for supporting said shaft against movement, a plurality of core members each having a like number of poles fixedly arranged on said shaft in interleaved relation, a plurality of magnetizing coils arranged upon said core members, an armature comprising discs rotatably mounted upon said shaft and pole members interconnecting said discs, said armature substantially inclosing said core members and said coils, and means for returning said armature to the initial position after rotation thereof.

6. In a rotating electro-magnet a shaft, means for supporting said shaft against movement, a plurality of core members each having a plurality of poles, said core members being affixed to and so arranged on said shaft that the poles of the several members extend in alternate directions, a plurality of magnetizing coils arranged upon said core members in concentric relation therewith and substantially enclosed by the poles thereof, an armature comprising discs of non-magnetic material and pole members interconnecting said discs rotatably mounted on said shaft in such manner, as to substantially enclose said core members and said coils, and means for returning said armature to the initial position after rotation thereof.

In testimony whereof I have hereunto subscribed my name this 2nd day of July, A. D. 1930.

THEODOR BUCHHOLD.